(12) United States Patent
Lockwood (10) Patent No.: US 9,414,079 B1
(45) Date of Patent: Aug. 9, 2016

(54) INTERLEAVING ENCODING

(71) Applicant: KYOCERA Document Solutions Inc., Osaka (JP)

(72) Inventor: Edwin Philip Lockwood, El Segundo, CA (US)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/665,434

(22) Filed: Mar. 23, 2015

(51) Int. Cl.
*G06K 9/36* (2006.01)
*H04N 19/186* (2014.01)

(52) U.S. Cl.
CPC .................................. *H04N 19/186* (2014.11)

(58) Field of Classification Search
CPC combination set(s) only.
See application file for complete search history.

(56) References Cited

U.S. PATENT DOCUMENTS

| | | | | |
|---|---|---|---|---|
| 7,032,158 B2 * | 4/2006 | Alvarez, II | ............ | G06F 9/4411 711/E12.089 |
| 7,243,193 B2 * | 7/2007 | Walmsley | ........... | G06F 12/0246 711/154 |
| 8,848,250 B2 * | 9/2014 | Su | .......................... | H04N 1/415 358/1.16 |
| 9,146,861 B2 * | 9/2015 | Ko | ...................... | G06F 12/0246 |
| 2002/0184579 A1 * | 12/2002 | Alvarez, II | ............ | G06F 9/4411 714/719 |
| 2006/0061795 A1 * | 3/2006 | Walmsley | ............... | G06F 21/75 358/1.14 |
| 2006/0132822 A1 * | 6/2006 | Walmsley | ........... | G06F 12/1408 358/1.14 |
| 2011/0238899 A1 * | 9/2011 | Yano | .................... | G06F 12/0246 711/103 |
| 2012/0210066 A1 * | 8/2012 | Joshi | .................... | G06F 12/0866 711/118 |
| 2015/0046632 A1 * | 2/2015 | Ko | ....................... | G06F 12/0246 711/103 |
| 2016/0080756 A1 * | 3/2016 | Wu | ....................... | H04N 19/423 375/240.25 |

* cited by examiner

*Primary Examiner* — Anand Bhatnagar
(74) *Attorney, Agent, or Firm* — McDonnell Boehnen Hulbert & Berghoff LLP (57) ABSTRACT

Example systems and related methods may relate to compressing a plurality of data channels. An example embodiment may include a controller determining a plurality of interleave allocations within a memory allocation. The interleave allocations correspond to a plurality of planes, which may represent color information planes. The plurality of data channels may be compressed into a plurality of compressed data channels. Subsequently, each of the plurality of compressed data channels may be stored at respective interleave allocations. A full interleave allocation condition may be determined based on a capacity of a respective interleave allocation being less than a predetermined threshold. In response to determining the full interleave allocation condition, a new interleave allocation may be requested from the controller. In response, the controller may determine a new interleave allocation.

20 Claims, 8 Drawing Sheets

Figure 1A

Plane 1 (Cyan)

Plane 2 (Magenta)

Plane 3 (Yellow)

Plane 4 (Black)

INTERLEAVING ENCODING

BACKGROUND

Image data may include information distributed among discrete image planes. The image planes may be distributed based on color (e.g. Cyan, Magenta, Yellow, and Black) or other attributes of an image (e.g. hue, saturation, value). Currently, compressing and storing image data into memory may include allocating memory for the compressed data from each plane in a sequential or a parallel manner.

In sequential memory allocation methods, memory may be allocated for one of the discrete image planes. The data from that image plane may be compressed and stored into the allocated memory. Further image plane data may be handled with further memory allocations. Sequential memory allocation may reduce memory fragmentation but may prevent parallel encoding of the image planes.

In parallel memory allocation methods, a memory allocation may be formed for each image plane. Subsequently, the data from each image plane may be compressed into the respective memory allocations. Parallel memory allocation may allow parallel handling of image data in multiple image planes, but may result in memory fragmentation or wasteful memory allocation.

Alternatively, image data may be compressed in a composite manner. Composite compression may include a single memory allocation into which information from all planes is compressed. As an example, JPEG compression handles image data in a composite manner. However, individual planes cannot be individually decompressed from the composite compressed data without decompressing all planes.

Accordingly, a need exists for image data-handling systems and methods that provide both efficient memory usage and parallel image plane compression and decompression.

SUMMARY

In a first aspect, a method is provided. The method preferably includes providing uncompressed source data. The uncompressed source data includes a plurality of uncompressed data channels corresponding to a plurality of planes. The method further includes determining, by a controller of a computer, a memory allocation within a memory. The memory allocation includes a memory address and a memory size. The method also includes determining, by the controller, a plurality of interleave allocations corresponding to the plurality of planes. Determining the plurality of interleave allocations is based on the memory address. Each of the plurality of interleave allocations includes a respective interleave allocation. The method yet further includes compressing each of the plurality of uncompressed data channels as a corresponding plurality of compressed data channels. The method additionally includes storing each of the plurality of compressed data channels at the respective interleave allocations. The method also includes determining a full interleave allocation condition based on a capacity of at least one respective interleave allocation being less than a threshold. The at least one respective interleave allocation is associated with at least one uncompressed data channel. The method additionally includes, responsive to the full interleave allocation condition, requesting a new respective interleave allocation from the controller. The method yet further includes determining, by the controller, a new respective interleave allocation. The new respective interleave allocation is based on the respective interleave allocation.

In a second aspect, a method is provided. The method preferably includes providing a memory. The memory includes a memory size and a plurality of interleave allocations. Each interleave allocation includes an initial data field and a corresponding link field. The link field includes a link to a next data field. The initial data field includes compressed data corresponding to one of a plurality of planes. The next data field includes further compressed data corresponding to one of the plurality of planes. The method includes initially adjusting a current pointer location to the initial data field and decompressing the compressed data within the initial data field into a respective uncompressed data channel. The method further includes, while decompressing the compressed data within the initial data field, determining a next link condition. Determining the next link condition includes having decompressed all data within the initial data field. The method also includes, responsive to determining the next link condition, adjusting a current pointer location to the next data field and decompressing the compressed data within the next data field into the respective uncompressed data channel.

In a third aspect, a system is provided. The system preferably includes a plurality of image compressors corresponding to a plurality of planes. The plurality of image compressors includes respective image compressors. The system also includes a computing device including a memory and a processor and a controller associated with the computing device. The controller is configured to execute instructions. The instructions include receiving uncompressed source data. The uncompressed source data includes a plurality of uncompressed data channels corresponding to the plurality of planes. The instructions include determining a memory allocation within the memory. The memory allocation includes a memory address and a memory size. The instructions further include determining a plurality of interleave allocations corresponding to the plurality of planes. Determining the plurality of interleave allocations is based on the memory address. The plurality of interleave allocations include respective interleave allocations. The instructions yet further include compressing each of the plurality of uncompressed data channels as a corresponding plurality of compressed data channels. The instructions also additionally include storing each of the plurality of the compressed data channels at the respective interleave allocations. The instructions include determining a full interleave allocation condition based on a capacity of at least one respective interleave allocation being less than a threshold. The at least one respective interleave allocation is associated with at least one uncompressed data channel. The instructions also include, responsive to the full interleave allocation condition, requesting a new respective interleave allocation from the controller. The instructions yet further include determining, by the controller, a new respective interleave allocation. The new respective interleave allocation is based on the respective interleave allocation.

Other aspects, embodiments, and implementations will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

The present disclosure may relate to a method and a system to interleave multiple compressed data planes within a memory allocation to efficiently handle memory space and allow encoding of discrete image planes. Specifically, a single memory allocation may be made for multiple planes of compressed data instead of an allocation for each plane. Within the memory allocation, interleave allocations may be allocated to each plane. Compressors configured to compress each plane may compress and store respective compressed data from each plane within the respective interleave allocations. Each compressed data plane may be decoded and decompressed separately. Further, packing and interleaving mechanisms may be independent of the compression method.

In some embodiments, compression and storage of the different planes can be performed using separate software threads or hardware channels using a common memory allocator. The systems and methods disclosed herein may simplify and improve performance of compression buffer memory management, reduce memory fragmentation, and improve overall computer performance.

In an example method embodiment, uncompressed image source data may include uncompressed data channels. Each of the data channels may correspond to an image plane. The uncompressed image source data may represent, for example, image data from an imaging device such as a scanner, multi-function device, camera, or another type of image sensor. Additionally or alternatively, the uncompressed image source data may include data from an uncompressed image file format, such as a RAW image format or a digital negative (DNG) format. Yet further, the uncompressed image data may include page image data obtained by, for example, interpreting and rendering portions of a page description language (PDL). Such image data may be provided by a host computing device such as a smart phone or a tablet.

To encode the uncompressed source data, a controller of a computer may determine a memory allocation within a memory. The memory allocation may include a memory address, a memory size, and an interleave size. The controller subsequently determines interleave allocations within the memory allocation that correspond to the uncompressed data channels. That is, the size and number of interleave allocations may be based on the number of planes in the image source data. Additionally, the size and number of interleave allocations may be determined based on the method of compression. Other factors may be incorporated to determine the interleave allocations.

In an example embodiment, each of a plurality of compressors may be assigned to a respective uncompressed data channel. In such a scenario, multiple compressors may compress the uncompressed data channels in parallel. Alternatively, one compressor may compress each of the uncompressed data channels.

Once compressed, each of the compressed data channels may then be stored at the respective interleave allocations. When an interleave allocation becomes full, a new interleave allocation may be requested. The controller may then determine or receive the new interleave allocation and store subsequent compressed data in the new interleave allocation.

The controller may determine the new interleave allocation based on the prior interleave allocation. For example, a memory of the new interleave allocation may be based on the prior interleave allocation address. Furthermore, the new interleave allocation size may be based on the prior interleave allocation size. Other ways to determine the new interleave allocation are possible.

To decode image plane data, a starting point of the compressed data related to the image plane within the memory allocation may be provided or calculated. A decompressor may then operate on the compressed data to extract the image plane data from the first interleave allocation. When a decompressor reaches the end of a current interleave allocation, it may move to a new respective interleave allocation via the link associated with the current interleave allocation. Once the decompressor reaches the end of the memory allocation, it may stop and notify a controller that decompression is complete.

II. System Examples

Figure 1A:
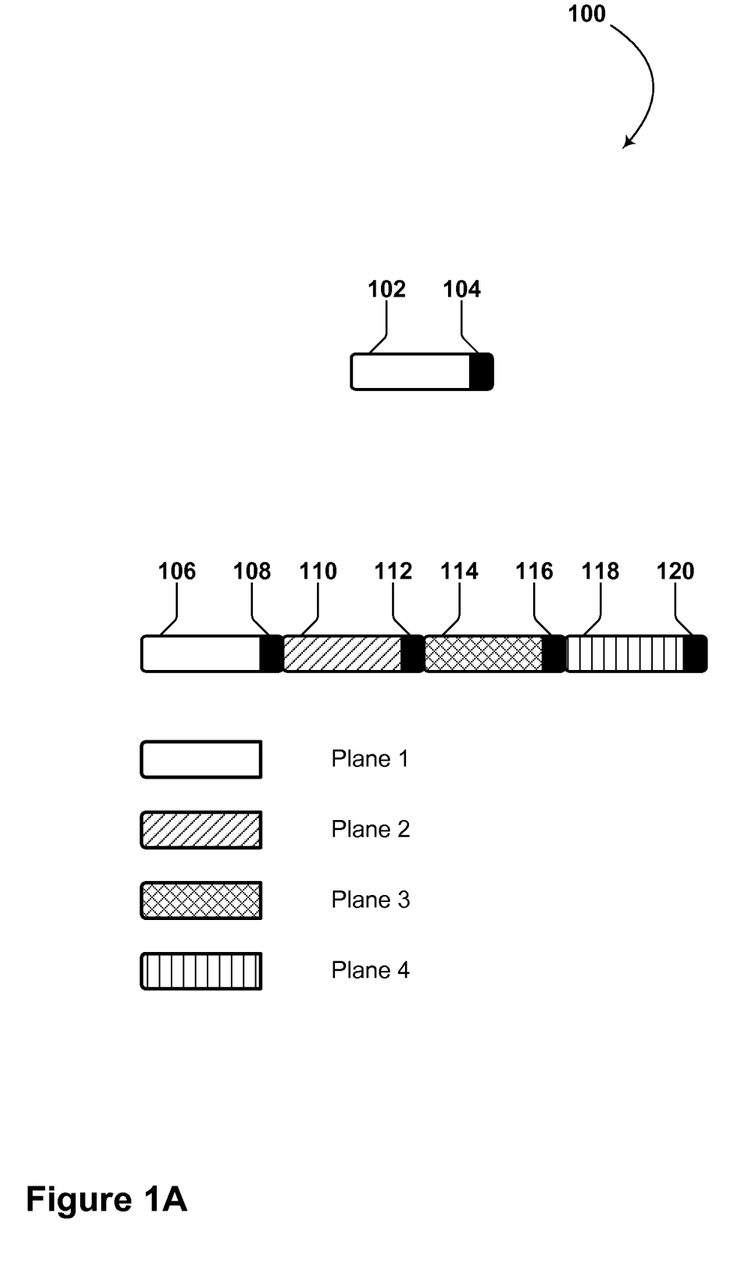
FIG. 1A is a schematic diagram illustrating a portion of a memory, according to an example embodiment.

FIG. 1A is a schematic diagram illustrating a portion of a memory 100, according to an example embodiment. The portion of memory 100 may be a memory allocation associated with any type of memory. For example, the memory may include a random access memory (RAM), a hard disk drive, a solid-state drive, a cloud drive, a physical diskette, a CD-ROM, or another type of memory. The portion of memory 100 may be associated with an allocation of physical memory. Alternatively or additionally, the portion of memory 100 may be associated with a virtual and/or dynamic memory allocation. The portion of memory 100 may also be a distributed memory, which may include more than one computer and/or more than one type of memory.

The portion of memory 100 may include a first data field 102 and a first link field 104. The first data field 102 and the first link field 104 may represent a single interleave allocation that corresponds to a respective image plane. The first data field 102 may include image data from a first data channel. For instance, if the image data is formatted according to cyan, magenta, yellow, and key (black) (CYMK) color channels, then the first data field 102 may include information about the cyan color channel as relates to the image data. Alternatively, the data field may relate to information from another type of image plane. For example, the data field may relate to hue, saturation, or value (HSV) data.

Within the context of the present disclosure, uncompressed image data may be compressed and stored in memory, for instance, to compress and store a digital image file. As described above, the uncompressed image data may relate to image data from a camera, scanner, multi-function device, or another type of image sensor. Alternatively or additionally, the uncompressed image data may be related to uncompressed image data stored in an uncompressed image file format, such as a RAW, DNG, or another type of file format.

In response to a request to compress and store uncompressed source image data, a controller may initially allocate a memory allocation (and interleave allocations) based on the number of data channels within the source image data. The memory allocation may be any size of memory. In an example embodiment, the interleave allocation size is smaller than the memory allocation size such that a plurality of interleave allocations may be associated with a given memory allocation. Alternatively or additionally, the interleave allocation size may be equal to the memory allocation size.

In an example embodiment, the controller may initially allocate, within the memory allocation 100, a first data field 106, a first link field 108, a second data field 110, a second link field 112, a third data field 114, a third link field 116, a fourth data field 118, and a fourth link field 120. Again, each of the first, second, third, and fourth data fields may relate to a color plane, e.g. cyan, magenta, yellow, and black, respectively. Alternatively, the first, second, third, and fourth data fields may relate to another type of data channel and/or image plane.

Figure 1B:
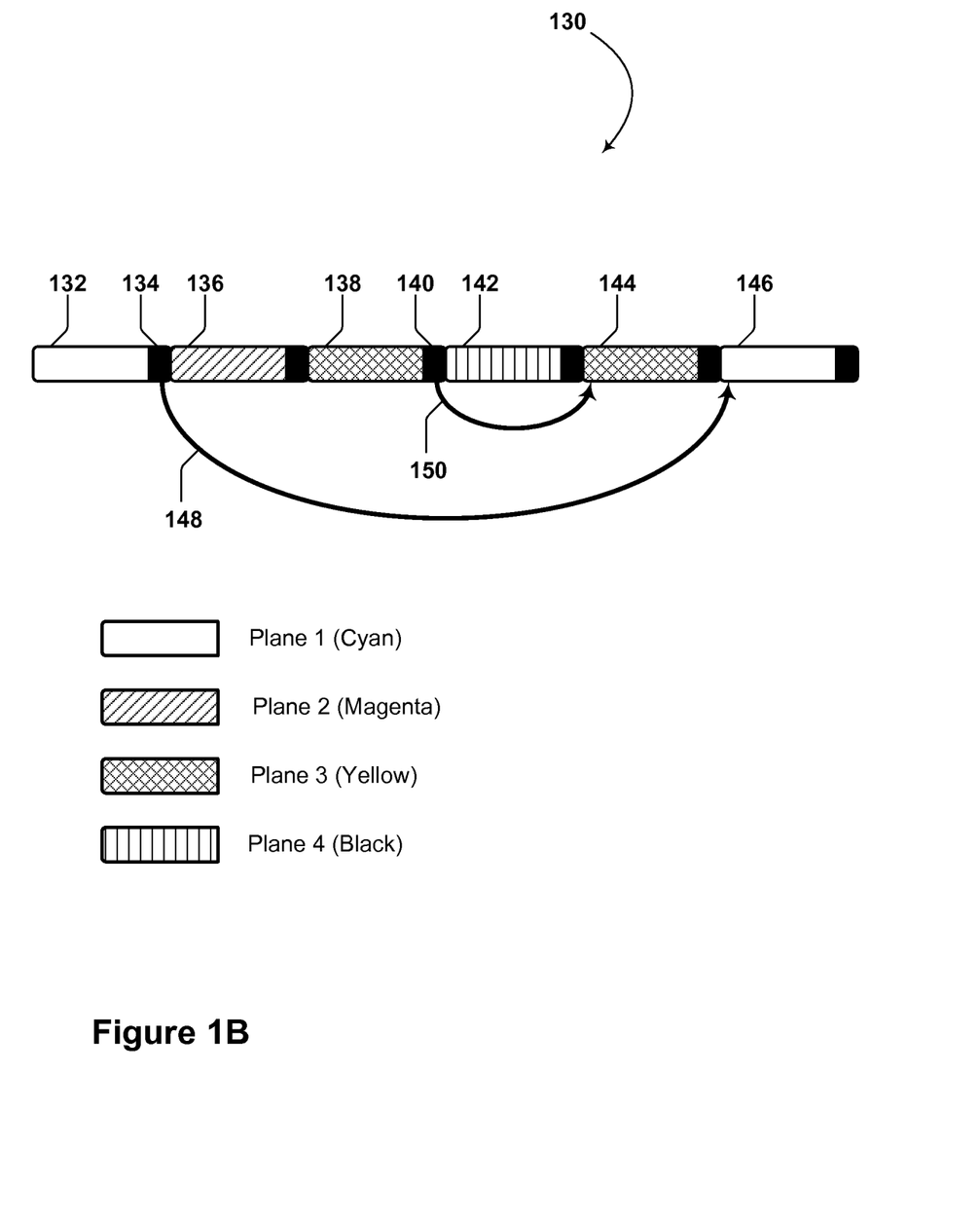
FIG. 1B is a schematic diagram illustrating a portion of a memory, according to an example embodiment.

FIG. 1B is a schematic diagram illustrating a portion of a memory 130, according to an example embodiment. Similar to FIG. 1A, the controller may initially allocate a first data field 132, a second data field 136, a third data field 138, and a fourth data field 142. Respective compressors may process uncompressed image data into the respective data fields based on planes in the image data. As the respective compressors fill up their interleave allocations, the compressors may request a further interleave allocation from an interleave manager. The interleave manager may allocate a further interleave allocation to the compressor and associated data channel. The further interleave allocation may be the same size as the initial interleave allocation. Alternatively, the further interleave allocation assigned by the interleave manager may be larger or smaller in size than the initial interleave allocation.

As an example, a third compressor may compress image data from the yellow color plane into the third data field 138. When the third data field 138 becomes full based on a predetermined threshold, the third compressor may request a further interleave allocation via the interleave manager. In response, the interleave manager may allocate a fifth data field 144 to store further compressed data relating to the yellow color plane. Accordingly, the third link field 140 may be updated to point to fifth data field 144 via a pointer 150.

While the third compressor is in operation, a first compressor may be compressing image data from the cyan color channel into the first data field 132. If the first data field 132 becomes full after the third data field 138, a sixth data field 146 may be allocated to store further compressed cyan image data. Accordingly, first link field 134 may be updated to point to the sixth data field 146 via pointer 148.

Figure 1C:
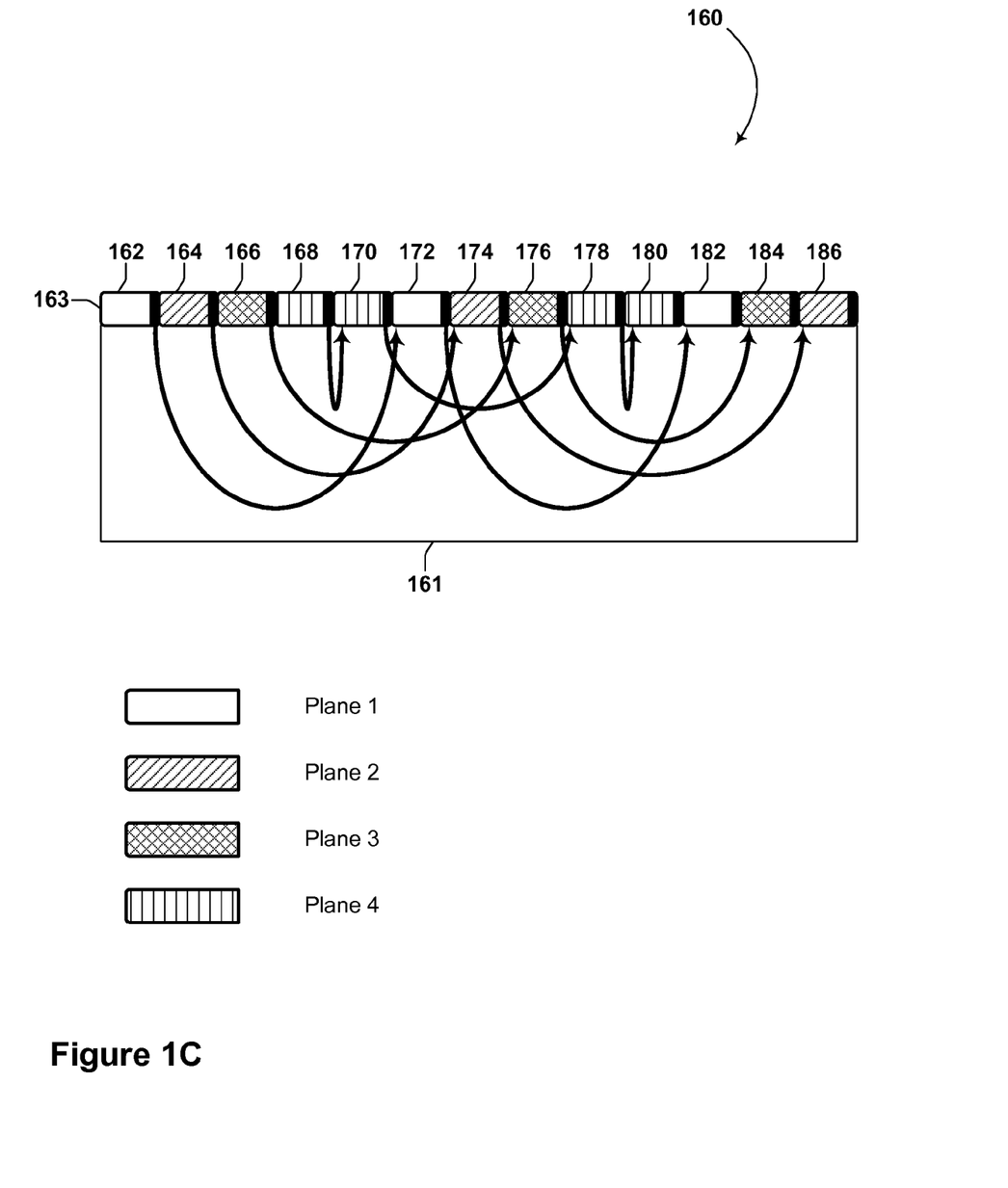
FIG. 1C is a schematic diagram illustrating a portion of a memory, according to an example embodiment.

FIG. 1C is a schematic diagram illustrating a portion of a memory 160, according to an example embodiment. In such a scenario, a computing device may include the portion of the memory 160 and at least one processor. The computing device may also include a controller. The controller is configured to execute instructions.

The controller may control a plurality of uncompressed data channels. One or more image compressors may be assigned or associated to compress data from each data channel. In an example embodiment, respective uncompressed data channels may include information relating to respective image planes. Accordingly, a respective compressor may be assigned or associated to compress data from each image plane.

The controller may include instructions related to receiving uncompressed source data. As described above, the uncompressed source data may include image data related to the plurality of image planes, e.g. CMYK image data. The controller may determine a memory allocation 161 within the memory. The memory allocation 161 may include a memory address, a memory size, and an interleave size. The memory address may include the starting memory address 163 of the memory allocation 161. Alternatively or additionally, the memory address may include another way to describe a physical, dynamic, and/or virtual location of the memory allocation 161.

In some embodiments, the interleave size may be predetermined. Alternatively, the interleave size may be determined and/or assigned dynamically by a memory manager.

The instructions may include determining interleave allocations that correspond to the plurality of planes. In an example embodiment, an interleave manager may provide an initial interleave allocation for each of the plurality of planes. Determining the interleave allocations may be based on the memory address and the interleave size.

As illustrated in FIG. 1C, interleave allocations 162, 164, 166, and 168 may represent initial interleave allocations for each of four planes. As described above, the four planes may relate to four different color planes from a digital image, e.g. CMYK image data.

The controller may also be configured to carry out instructions that include compressing each of the plurality of uncompressed data channels as a corresponding plurality of compressed data channels. That is, the controller may cause a compressor to compress the uncompressed data from each of the image planes to form a compressed data channel.

The instructions may further include, subsequent to the data compression, storing each of the compressed data channels at the respective interleave allocations. In other words, the compressed data corresponding to each plane is stored within each of the respective interleave allocations.

When a respective interleave allocation becomes full, the controller may be operable to determine a full interleave allocation condition. The full interleave allocation condition may occur when a remaining capacity of the respective interleave allocation becomes less than a threshold and when further uncompressed data relating to the relevant data channel remains to be stored.

When the controller determines the full interleave allocation condition, a request may be made requesting a new respective interleave allocation from the interleave manager. The new respective interleave allocation may be determined based on, for example, the prior interleave allocation size, the prior interleave allocation address, and the relevant uncompressed data channel.

In reference to FIG. 1C, the initial interleave allocation 168, which relates to plane 4, may become full before the other interleave allocations. In such a scenario, the controller or other hardware and/or software may request a new interleave allocation from the interleave manager. In response, the interleave manager may provide interleave allocation 170.

In a similar fashion, as respective interleave allocations become full, new interleave allocation 172, 174, 176, 178, 180, 182, 184, and 186 may be provided.

The controller may determine a compression complete condition based on the uncompressed source data being completely compressed. In other words, in response to compressing all remaining source data, the controller may determine a complete condition and set a corresponding flag. Alternatively or additionally, the controller may be configured or programmed to request a new memory allocation if uncompressed source data has not been completely compressed.

In an example embodiment, further interleave allocations may be made within the memory allocation, provided the memory allocation has sufficient space for the further interleave allocations. However, if the memory allocation has insufficient space, an additional memory allocation may be requested and allocated by the memory manager. In such a scenario, further interleave allocations may be made from the new memory allocation.

While FIGS. 1A-C illustrate four different image planes, more or fewer planes are possible within the context of this disclosure. Furthermore, while examples described above relate to embodiments with CMYK image planes, the planes may relate to different ways of conveying image information. For instance, the different planes may correspond to red, green, and blue (RGB) color planes. Alternatively, the different planes may correspond to hue, saturation, and value (HSV). Yet further, the different planes may include an alpha transparency channel. Other types of data or metadata may be encoded and decoded via the described data channels using the systems and methods described herein.

Figure 2A:
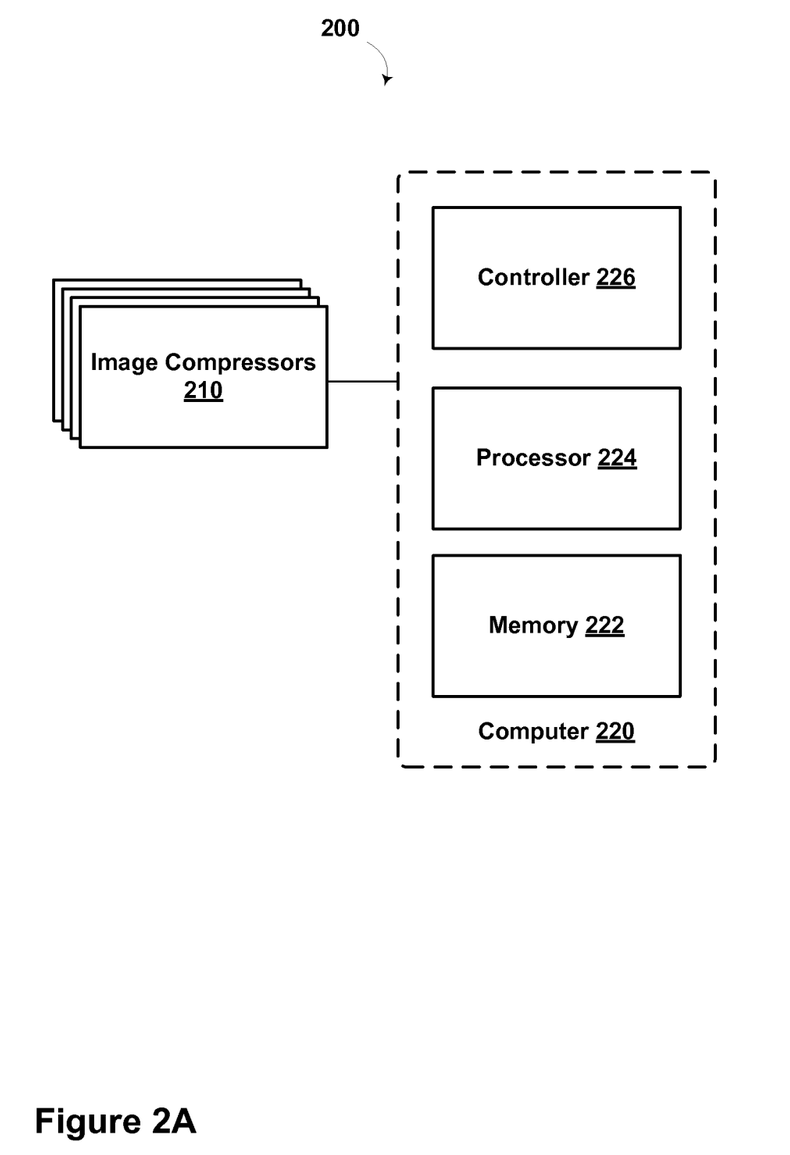
FIG. 2A is a schematic block diagram illustrating a system, according to an example embodiment.

FIG. 2A is a schematic block diagram illustrating a system 200, according to an example embodiment. The system 200 may include image compressors 210 and a computer 220. The computer 220 may include a controller 226, one or more processors 224, and a memory 222.

The image compressors 210 may include a plurality of similar hardware and/or software configured to compress data related to a respective data channel. In some embodiments, one image compressor may correspond to one respective data channel or image plane. In other embodiments, more than one image compressor may be assigned to or associated with a respective data channel, e.g. multiple stage compression.

The image compressors 210 may compress data in a lossless or lossy manner in an effort to reduce file size and/or information complexity. In an example embodiment, a respective image compressor 210 may compress data relating to a respective image plane by identifying and eliminating statistical redundancy. In another embodiment, the respective image compressor 210 may identify unnecessary information and remove or change it.

The image compressors 210 may encode data using a variety of different compression algorithms. In an example embodiment, a Lempel-Ziv (LZ) compression method may be used to encode an uncompressed data channel. Other algorithms and/or codecs, such as DEFLATE, Lempel-Ziv-Renau (LZR), Huffman encoding, JPEG, JPEG 2000, split run-length encoding (SRLE), double run-length encoding (DRLE), adaptive lossless data compression (ALDC), and m×n halftone matrix interleaving (e.g. as described in U.S. Pat. No. 8,848,250, which is hereby incorporated by reference herein) may be utilized alone or in any combination within the context of the present disclosure.

The computer 220 and associated controller 226 may be configured to control the image compressors 210. Specifically, the controller 226 may carry out some or all of the functions, method steps, and/or blocks described relating to encoding, decoding, and storing image information. The one or more processors 224 may reside in one or more physical locations. Furthermore, the processors 224 and/or the memory 222 may form part of a distributed computing system.

Figure 2B:
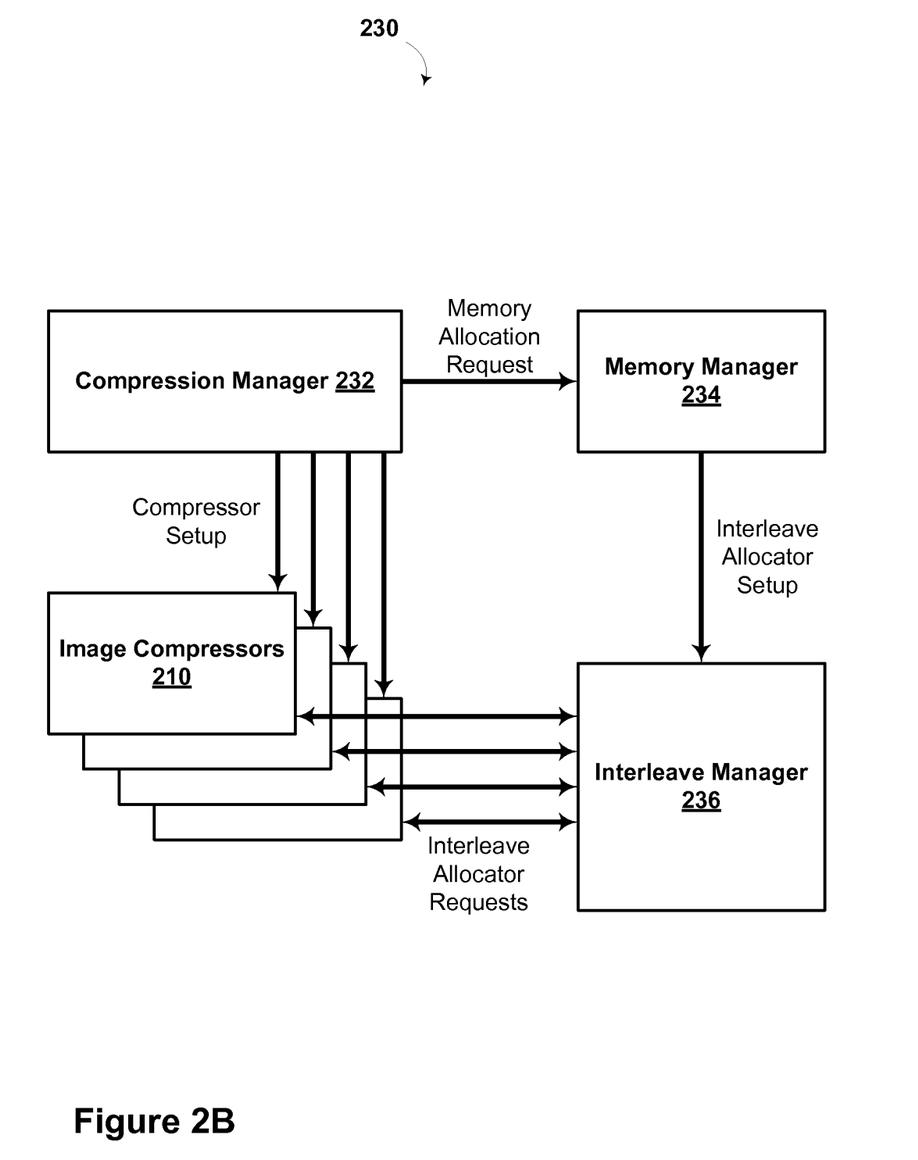
FIG. 2B is a schematic block diagram illustrating a controller, according to an example embodiment.

FIG. 2B is a schematic block diagram illustrating a controller 230, according to an example embodiment. The controller 230 may include a compression manager 232, a memory manager 234, and an interleave manager 236.

The compression manager 232 may be configured to provide compression setup instructions to the image compressors 210. The compression setup instructions may include information about the encoding/decoding algorithms to be used by the image compressors 210. Other types of compression setup instructions are possible.

The compression manager 232 may be further configured to provide a memory allocation request to the memory manager 234. In response to receiving the memory allocation request, the memory manager 234 may be configured to allocate a portion of memory. The memory manager 234 may provide a physical, dynamic, or virtual memory location and/or other interleave allocation setup information to the interleave manager 236. The interleave manager 236 may be configured to determine initial interleave allocations that correspond to the respective image planes. Furthermore, the interleave manager 236 may be configured to provide a physical, dynamic, or virtual memory location (or a link to such a location) to the image compressors 210.

In an example embodiment, the image compressors 210 may request a new interleave allocation when a current interleave allocation becomes full. In response, the interleave manager 236 may be configured to provide new interleave allocations to the image compressors 210.

The various elements and functions of controller 230 may include and/or be carried out by hardware, software, or any combination thereof.

III. Method Examples

Figure 3:
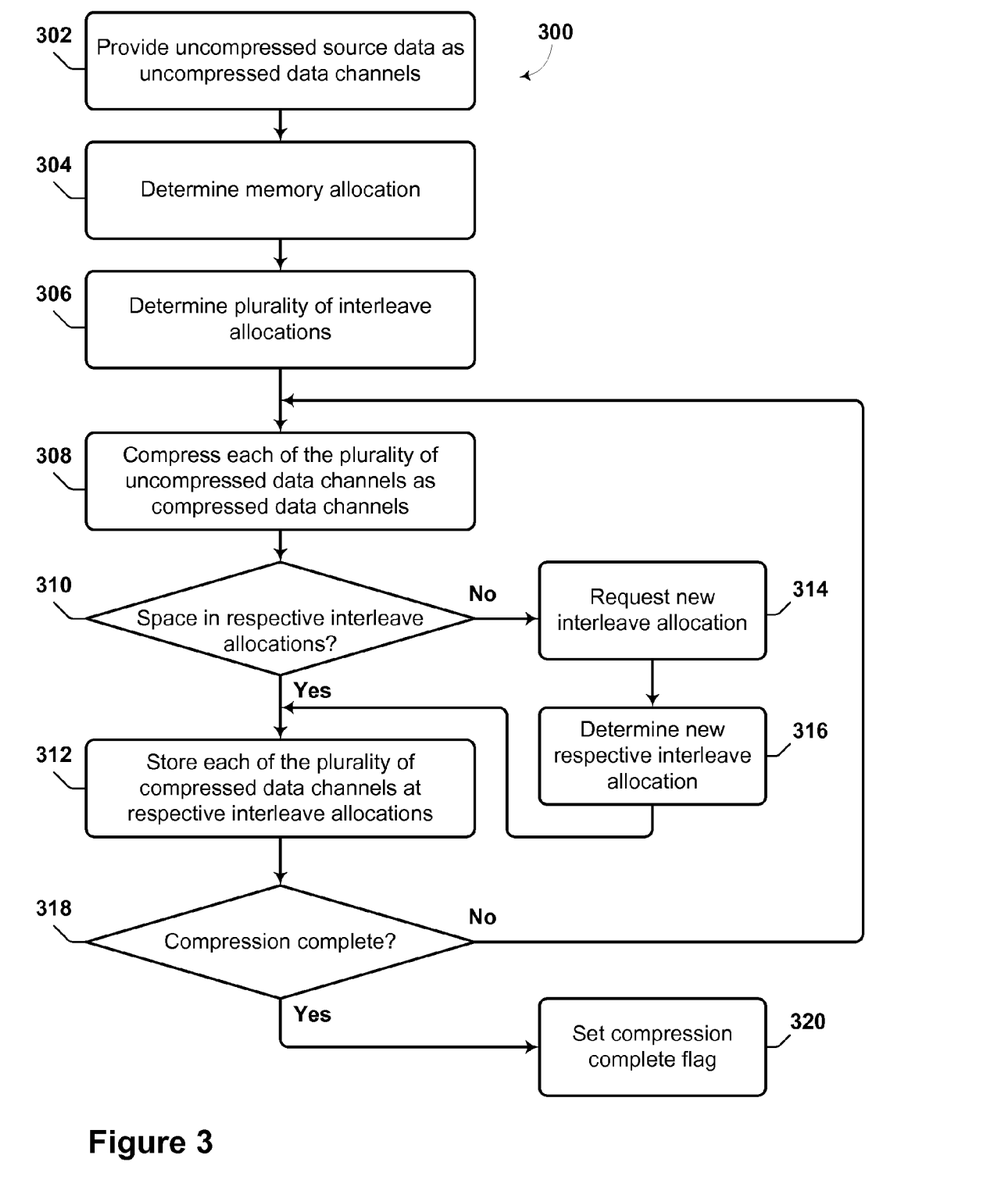
FIG. 3 is a flow diagram illustrating a method, according to an example embodiment.

FIG. 3 is a flow diagram illustrating a method 300, according to an example embodiment. Although FIG. 3 illustrates method 300 as including certain blocks in a particular order, it should be understood that blocks may be added, subtracted, and/or carried out in a different order. Furthermore some or all of the blocks of method 300 may be carried out by system 200 and/or controller 230 as illustrated and described in reference to FIG. 2A and FIG. 2B.

Block 302 includes providing uncompressed source data as uncompressed data channels. In an example embodiment, controller 230 may receive the uncompressed source data, which may be from a camera, a scanner, a multi-function device. Alternatively or additionally, the uncompressed source data may be received in a particular file format.

Block 304 includes determining a memory allocation. As described above in relation to FIG. 2B, the compression manager 232 may request a new memory allocation. In response, the memory manager 234 may allocate a portion of memory, based on, for example, a portion of unused memory and/or the size of the uncompressed source data.

Block 306 includes determining a plurality of interleave allocations. In an example embodiment, the memory manager 234 may allocate an initial set of interleave allocations that correspond to the respective data channels.

Block 308 includes compressing each of the plurality of uncompressed data channels as compressed data channels. As described above, respective compressors, such as image compressors 210, may encode the respective uncompressed data channels using a variety of different compression methods, formats, and algorithms.

Block 310 includes determining whether a full interleave allocation condition exists. For example, this block may include determining whether space remains in one or more respective interleave allocations. If a remaining capacity of a respective interleave allocation is greater than a predetermined threshold, the respective image compressor may continue to store compressed data into the interleave allocation. However, if the remaining capacity of the respective interleave allocation is less than a predetermined threshold, a new interleave allocation may be requested.

Block 312 includes storing each of the plurality of compressed data channels at respective interleave allocations. In other words, the image compressors 210 may store the compressed data at the respective interleave allocations within the memory allocation.

Block 314 includes the respective image compressor requesting a new interleave allocation from the interleave manager. In turn, as illustrated in block 316, the interleave manager may determine a new respective interleave allocation and the compressor may further store compressed data at the new respective interleave allocation (block 312).

Block 318 includes the controller determining whether compression is complete. That is, the controller determines whether further uncompressed source data must be compressed. If so, the compressors may continue to store compressed data in the respective interleave allocations as in block 308. If no further uncompressed source data remains to be compressed, block 320 includes the controller setting a compression complete flag.

Figure 4:
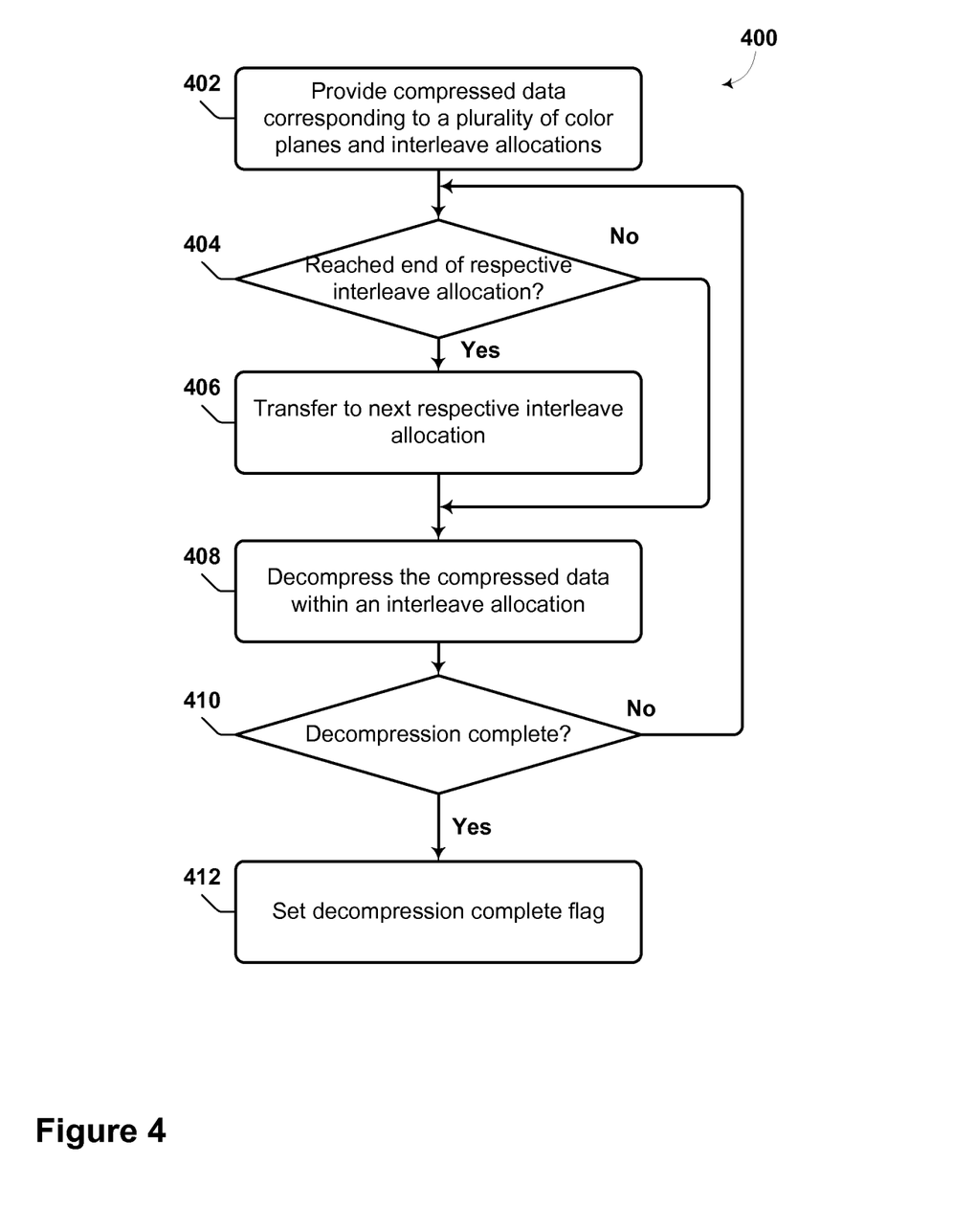
FIG. 4 is a flow diagram illustrating a method, according to an example embodiment.

FIG. 4 is a flow diagram illustrating a method 400, according to an example embodiment. Although FIG. 4 illustrates method 400 as including certain blocks in a particular order, it should be understood that blocks may be added, subtracted, and/or carried out in a different order. Furthermore some or all of the blocks of method 400 may be carried out by system 200 and/or controller 230 as illustrated and described in reference to FIG. 2A and FIG. 2B.

Block 402 includes providing compressed data corresponding to a plurality of color planes and related interleave allocations. The compressed data may include an image file compressed according to at least one of the methods described herein. Namely, the image file may include multiple image planes that relate to multiple interleave allocations.

Block 404 includes determining whether the decompressor has reached a link field. That is, as the decompressor is decompressing data within a respective interleave allocation, it may reach the end of the present data field and may be presented with a link field. The link field may represent the next data field at which compressed information related to the respective image plane may be located. If the decompressor has not yet reached a link field, it may be configured to continue decompressing compressed data within the data field, as described in reference to block 408.

Block 406 includes if the decompressor has reached the link field, the decompressor or the controller may adjust a current pointer location to correspond with the link position from the link field. That is, the decompressor may transfer to the next respective interleave allocation.

Block 408 includes decompressing the compressed data within an interleave allocation. In other words, one or more decompressors may decompress the compressed data from a given interleave allocation. The decompressors may include hardware, software, or a combination thereof configured to decode image data from a compressed state.

Decompressing compressed data may include a variety of decompression algorithms. Generally, the decompression algorithm will be used based on the original compression type. For example, a codec used to encode the image may be used "in reverse" to decode the compressed image data. The compression type may be provided via metadata or by another means.

Block 410 includes determining whether decompression is complete. The decompression complete condition may be based on the accumulated size of the compressed data within a respective data channel. Additionally or alternatively, the decompression complete condition may be based on the current pointer location. Further, the decompression complete condition may be based on various indicators within the compressed data. For example, a marker, a token, an instruction, or a code in the compressed data may indicate that decompression is complete.

In an example embodiment, the controller may determine that no further compressed data remains to be decompressed based on the pointer position being at the end of the memory allocation. If so, a decompression complete flag may be set in software or hardware, as shown in block 412. If decompression is not complete, the method may return to block 404.

Figure 5:
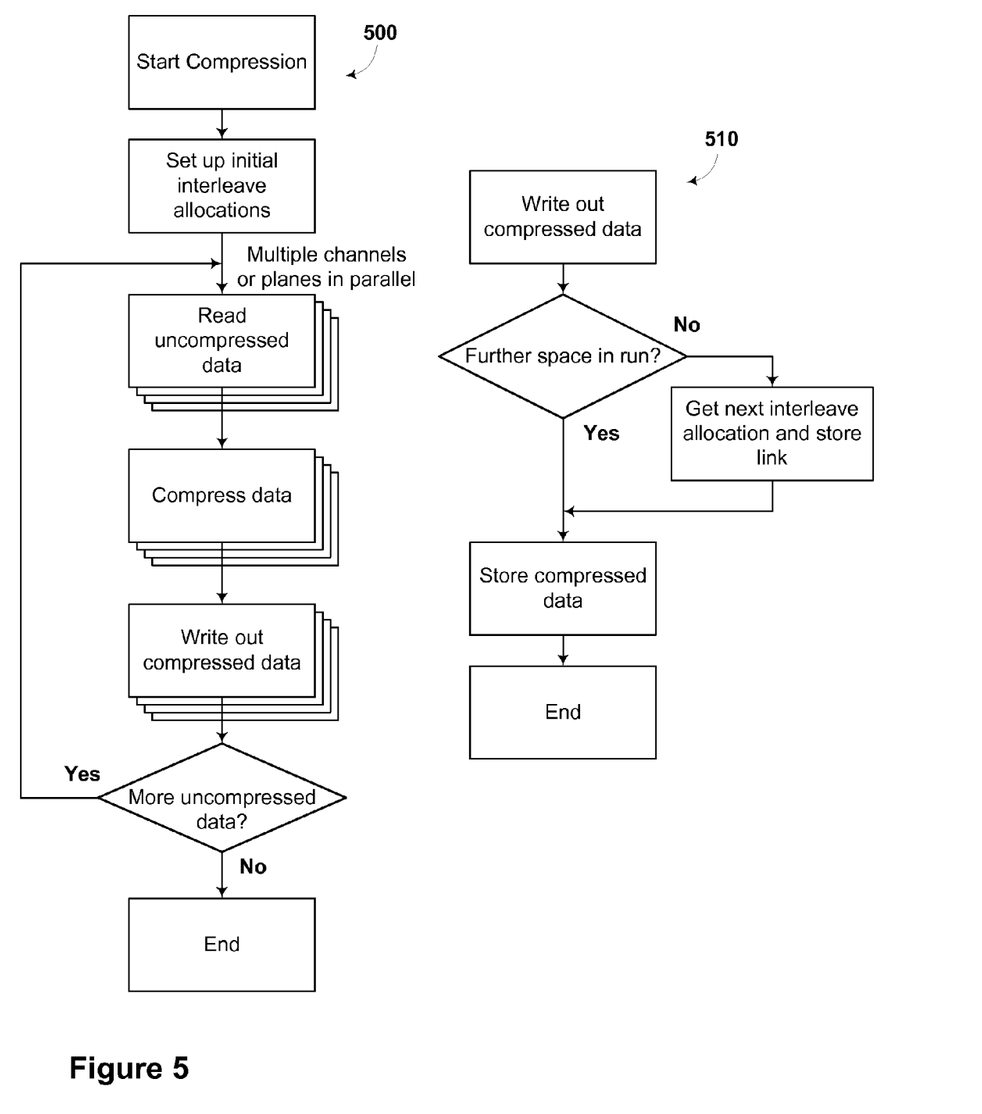
FIG. 5 is a flow diagram illustrating a method, according to an example embodiment.

FIG. 5 is a flow diagram illustrating a method 500, according to an example embodiment. Namely, method 500 may include a method for compressing data in multiple channels. The blocks or steps in method 500 may be carried out by system 200 and/or controller 230 as illustrated and described in reference to FIG. 2A and FIG. 2B.

Method 500 includes setting up initial interleave allocations based on multiple data channels or planes. The uncompressed data may be read into the data channels in parallel. The uncompressed data may be compressed in parallel by, for instance, multiple data compressors running compression algorithms. Method 500 includes writing out the compressed data and determining whether further uncompressed data remains to be compressed.

Method 500 may include an interleaving method 510. Interleaving method 510 may include, after writing out the compressed data, determining whether further memory space exists in the current interleave allocation. If insufficient memory exists in the current interleave allocation, the method 510 may include requesting and obtaining a new interleave allocation. The interleaving method 510 may also include storing a link associated with the new interleave allocation. The interleaving method 510 includes storing compressed data within the interleave allocation. Interleaving method 510 may end by returning to steps illustrated in method 500. Namely, after storing the compressed data, the method 500 may then include determining whether further uncompressed data remains to be compressed.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A method comprising:
providing uncompressed source data, wherein the uncompressed source data comprises a plurality of uncompressed data channels corresponding to a plurality of planes;
determining, by a controller of a computer, a memory allocation within a memory, wherein the memory allocation comprises a memory address, and a memory size;
determining, by the controller, a plurality of interleave allocations corresponding to the plurality of planes, wherein the determining the plurality of interleave allocations is based on the memory address, and wherein each of the plurality of interleave allocations comprises a respective interleave allocation;

compressing each of the plurality of uncompressed data channels as a corresponding plurality of compressed data channels; and storing each of the plurality of compressed data channels at the respective interleave allocations;

determining a full interleave allocation condition based on a capacity of at least one respective interleave allocation being less than a threshold, wherein the at least one respective interleave allocation is associated with at least one uncompressed data channel;

responsive to the full interleave allocation condition, requesting a new respective interleave allocation from the controller; and determining, by the controller, a new respective interleave allocation, wherein the new respective interleave allocation is based on the respective interleave allocation.

2. The method of claim 1 further comprising:

determining a compression complete condition based on the uncompressed source data being completely compressed; and responsive to the compression complete condition, setting a compression complete flag.

3. The method of claim 1 further comprising decompressing the plurality of compressed data channels into a plurality of respective uncompressed data channels.

4. The method of claim 1 wherein the plurality of planes comprises color planes corresponding to cyan, magenta, yellow, and black.

5. The method of claim 4 wherein the plurality of planes further comprises an alpha transparency channel.

6. The method of claim 1 wherein the plurality of planes comprises color planes corresponding to red, green, and blue.

7. The method of claim 1 wherein the plurality of planes comprises planes corresponding to hue, saturation, and value.

8. A method comprising:

providing a memory comprising:
  a memory size; and
  a plurality of interleave allocations, wherein each interleave allocation comprises an initial data field and a corresponding link field, wherein the link field comprises a link to a next data field, wherein the initial data field comprises compressed data corresponding to one of a plurality of planes, and wherein the next data field comprises further compressed data corresponding to one of the plurality of planes;

initially adjusting a current pointer location to the initial data field;

decompressing the compressed data within the initial data field into a respective uncompressed data channel;

while decompressing the compressed data within the initial data field, determining a next link condition, wherein determining the next link condition comprises having decompressed all data within the initial data field; and responsive to determining the next link condition, adjusting a current pointer location to the next data field and decompressing the compressed data within the next data field into the respective uncompressed data channel.

9. The method of claim 8 further comprising:

determining a decompression complete condition based on the memory size and the current pointer location; and responsive to the decompression complete condition, setting a decompression complete flag.

10. The method of claim 8 further comprising compressing a plurality of uncompressed data channels into a plurality of respective compressed data channels.

11. The method of claim 8 wherein the plurality of planes comprises color planes corresponding to cyan, magenta, yellow, and black.

12. The method of claim 11 wherein the plurality of planes further comprises an alpha transparency channel.

13. The method of claim 8 wherein the plurality of planes comprises color planes corresponding to red, green, and blue.

14. The method of claim 8 wherein the plurality of planes comprises planes corresponding to hue, saturation, and value.

15. A system comprising:

a plurality of image compressors corresponding to a plurality of planes, wherein the plurality of image compressors comprise respective image compressors;

a computing device comprising a memory and a processor; and a controller associated with the computing device, wherein the controller is configured to execute instructions, and wherein the instructions comprise:

receiving uncompressed source data, wherein the uncompressed source data comprises a plurality of uncompressed data channels corresponding to the plurality of planes;

determining a memory allocation within the memory, wherein the memory allocation comprises a memory address, a memory size;

determining a plurality of interleave allocations corresponding to the plurality of planes, wherein the determining the plurality of interleave allocations is based on the memory address, and wherein the plurality of interleave allocations comprise respective interleave allocations;

compressing each of the plurality of uncompressed data channels as a corresponding plurality of compressed data channels;

storing each of the plurality of the compressed data channels at the respective interleave allocations;

determining a full interleave allocation condition based on a capacity of at least one respective interleave allocation being less than a threshold, wherein the at least one respective interleave allocation is associated with at least one uncompressed data channel;

responsive to the full interleave allocation condition, requesting a new respective interleave allocation from the controller; and determining, by the controller, a new respective interleave allocation, wherein the new respective interleave allocation is based on the respective interleave allocation.

16. The system of claim 15 wherein the instructions further comprise:

determining a compression complete condition based on the uncompressed source data being completely compressed; and responsive to the compression complete condition, setting a compression complete flag.

17. The system of claim 15 wherein the plurality of planes comprises color planes corresponding to cyan, magenta, yellow, and black.

18. The system of claim 17 wherein the plurality of planes further comprises an alpha transparency channel.

19. The system of claim 15 wherein the plurality of planes comprises color planes corresponding to red, green, and blue.

20. The system of claim 15 wherein the plurality of planes comprises planes corresponding to hue, saturation, and value.

* * * * *